(12) United States Patent
Plass et al.

(10) Patent No.: US 11,512,017 B2
(45) Date of Patent: Nov. 29, 2022

(54) METHOD AND APPARATUS FOR PRODUCING A GLASS COMPONENT

(71) Applicant: Heraeus Quarzglas GmbH & Co. KG, Hanau (DE)

(72) Inventors: Jacqueline Plass, Hanau (DE); Dörte Schönfeld, Hanau (DE); Clemens Schmitt, Hanau (DE); Alexander Laaz, Hanau (DE); Andreas Langner, Hanau (DE); Gerhard Schötz, Hanau (DE); Walter Lehmann, Hanau (DE); Michael Hünermann, Hanau (DE); Stefan Weidlich, Hanau (DE); Jürgen Schäfer, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 364 days.

(21) Appl. No.: 16/804,760

(22) Filed: Feb. 28, 2020

(65) Prior Publication Data
US 2020/0277217 A1    Sep. 3, 2020

(30) Foreign Application Priority Data

Mar. 1, 2019 (EP) ..................................... 19160395

(51) Int. Cl.
*C03B 37/012* (2006.01)

(52) U.S. Cl.
CPC .... *C03B 37/0122* (2013.01); *C03B 37/01297* (2013.01); *C03B 2201/02* (2013.01); *C03B 2201/06* (2013.01); *C03B 2205/63* (2013.01)

(58) Field of Classification Search
CPC .......... C03B 37/0126; C03B 37/01248; C03B 37/0122; C03B 37/01297; C03B 2201/02;
(Continued)

(56) References Cited

U.S. PATENT DOCUMENTS

| 2,210,096 A | * | 8/1940 | Pennell | ................. F16G 11/048 |
| | | | | 403/303 |
| 6,987,917 B2 | * | 1/2006 | Hirano | ................ C03B 37/0126 |
| | | | | 65/435 |

(Continued)

FOREIGN PATENT DOCUMENTS

| DE | 3521119 | 12/1986 |
| DE | 4114914 A * | 11/1992 ......... G01N 30/6039 |

(Continued)

*Primary Examiner* — Matthew J Daniels
*Assistant Examiner* — Steven S Lee
(74) *Attorney, Agent, or Firm* — Dicke, Billig & Czaja, PLLC

(57) ABSTRACT

In known methods for producing a glass component, a void-containing intermediate product containing doped or non-doped SiO$_2$ is inserted into a sheath tube composed of glass, which has a longitudinal axis and an inner bore, and is thermally treated therein. In order to subject the intermediate product to a thermal and/or reactive treatment that is reproducible and uniform in its effect from this starting point, it is proposed in one embodiment that into the sheath tube's inner bore a first gas-permeable gas diffuser is inserted which is displaceable along the sheath tube's longitudinal axis and is pressed against the intermediate product during the thermal treatment.

14 Claims, 3 Drawing Sheets

(58) Field of Classification Search
CPC ............ C03B 2201/06; C03B 37/0297; C03B 37/01217; C03B 37/01225
See application file for complete search history.

(56) References Cited

U.S. PATENT DOCUMENTS

| | | | | |
|---|---|---|---|---|
| 7,486,862 | B2* | 2/2009 | Ohga | C03B 37/01231 65/393 |
| 8,161,772 | B2* | 4/2012 | Sattmann | C03B 37/02736 65/412 |
| 8,720,230 | B2 | 5/2014 | Sandoz et al. | |
| 2002/0189296 | A1* | 12/2002 | Cain | C03B 37/01211 65/412 |
| 2003/0230118 | A1* | 12/2003 | Dawes | C03B 37/0122 65/393 |
| 2004/0005127 | A1* | 1/2004 | Kliner | C03B 37/01225 385/114 |
| 2004/0031290 | A1* | 2/2004 | DiGiovanni | C03B 37/01248 65/412 |
| 2004/0042726 | A1* | 3/2004 | Kersey | G01D 5/35316 385/27 |
| 2004/0065121 | A1* | 4/2004 | Kotulla | C03B 19/1484 65/421 |
| 2006/0288738 | A1* | 12/2006 | Ruzzier | C03B 37/01486 65/421 |
| 2009/0324817 | A1* | 12/2009 | Sowa | C03B 19/1484 118/500 |
| 2015/0128649 | A1* | 5/2015 | Boughton | C03B 37/01205 65/483 |
| 2019/0031553 | A1* | 1/2019 | Clawson | C03C 25/6226 |

FOREIGN PATENT DOCUMENTS

| | | | | |
|---|---|---|---|---|
| DE | 19751919 | A1 * | 6/1998 | ......... C03B 19/1484 |
| DE | 102004054654 | A1 * | 5/2006 | ....... C03B 37/01211 |
| EP | 2 261 182 | | 12/2010 | |
| GB | 2 176 472 | | 12/1986 | |
| JP | 2001010837 | A * | 1/2001 | ....... C03B 37/01211 |
| JP | 2010247340 | A * | 11/2010 | |
| JP | 2013001629 | A * | 1/2013 | ......... C03B 37/0122 |

* cited by examiner

METHOD AND APPARATUS FOR PRODUCING A GLASS COMPONENT

CROSS-REFERENCED TO RELATED APPLICATION

This Utility Patent Application claims priority to European Application No. 19 160 395.0 filed on Mar. 1, 2019, which is incorporated herein by reference.

TECHNICAL FIELD

One aspect relates to a method for producing a glass component, comprising the following method steps:
(a) preparation of a void-containing intermediate product that contains doped or non-doped $SiO_2$,
(b) introduction of the intermediate product into a sheath tube composed of glass, which has a longitudinal axis and an inner bore, and
(c) thermal treatment of the intermediate product in the sheath tube.

In addition, one aspect relates to an apparatus for producing a glass component, comprising a sheath tube composed of glass for receiving a void-containing intermediate product, wherein the sheath tube has a longitudinal axis and an inner bore.

To create specific properties, quartz glass is doped with other substances. Components composed of doped quartz glass are used e.g. for producing fittings and components for semiconductor fabrication, fiber amplifiers, fiber lasers, microstructured optical fibers, passive fibers with a modified core refractive index or modified attenuation properties, e.g. for telecommunications, filter glasses or for sensor materials.

BACKGROUND

In known methods of producing optical preforms, starting components are introduced into a sheath tube composed of quartz glass and fused together with said sheath tube to form a preform.

A "vitrification in a sheath tube" of this type for producing a preform for active optical fibers is described e.g. in U.S. Pat. No. 8,720,230 B2. Here, $SiO_2$ powder and a powder composed of a rare earth metal compound, which can also be present in soluble form, e.g. as a water-soluble chloride, is mixed with water or alcohol to form a slip. In order to establish the desired refractive index, dopants such as $GeO_2$, $P_2O_5$, $Al_2O_3$ and/or $B_2O_3$ can be added to the slip. The slip is dried and ground to form a mixed powder of $SiO_2$, rare earth metal and dopant. The mixed powder is placed in a quartz glass tube with a vertically oriented longitudinal axis, the bottom end of which is sealed with a plug composed of porous glass. For cleaning and calcining purposes, the mixed powder is exposed at a temperature below the vitrification level (e.g. at approx. 1200° C.) to a gas stream containing oxygen, helium, chlorine or fluorine, which is introduced into the inner chamber through the porous plug. Finally the gas is pumped out of the inner chamber and the mixed powder is zonally-melted together with the quartz glass tube at a temperature above the vitrification level (preferably 2100° C.) and at the same time elongated to form a first preform. The vitrified mixed powder forms the core material of the preform and the quartz glass tube forms the cladding material.

The first preform produced in this way is installed in a further quartz glass sheath tube, optionally with further rods, tubes or preforms, and the remaining space is filled with a second $SiO_2$ powder, which can also be doped. Next, the inner chamber of the quartz glass sheath tube is placed under vacuum and the entire packing is sintered and vitrified to form a second preform or is drawn directly into an optical fiber.

US 2004/0005127 A1 describes a method of producing a preform for rare earth metal doped fibers. The preform is made from a bundle of rods, which is inserted into a thin-walled quartz glass tube. At the ends of the tube, porous glass wool plugs are provided, which abut against the bundle and prevent a lateral displacement of individual rods. The bundle is subjected to a cleaning and drying treatment in the quartz glass tube.

From US 2004/0031290 A1 a method of sintering a doped glass soot body is known, in which said soot body is zonally heated in a sheath tube rotating about its longitudinal axis.

From EP 2 261 182 A1 a method of producing a preform is known, in which a fluorine-containing gas flows through a heated bed of glass particles in a sheath tube.

A method in which a rod-shaped soot body composed of silicon dioxide is vitrified inside a sheath tube is known from DE 35 21 119 A1. The sheath tube consists of quartz glass and forms the cladding glass of a preform for optical fibers. While passing through a heating zone, the cladding glass shrinks on to the vitrifying soot body in a non-releasable manner.

When the intermediate product is pretreated in the sheath tube with inert or reactive treatment gas, the sheath tube is flooded with the treatment gas, exposing the intermediate product to the treatment atmosphere.

During this process, it can happen that the treatment gas finds preferred flow paths, so that "dead zones" form in the intermediate product, which have relatively little or no contact with the treatment gas. A homogeneous pretreatment, such as e.g. a complete clean, is not therefore guaranteed. This applies in particular in the case of empty space in the sheath tube inner bore and in the case of intermediate products with a large pore volume.

During sintering or vitrification of the intermediate product in sheath tube vitrification, it is useful to apply a vacuum to prevent the inclusion of bubbles in the melting glass. Furthermore, the porous intermediate product shrinks significantly during sintering or vitrification, which can result in the formation of voids.

It has been shown that the sheath tube can cave in (collapse) locally in an uncontrolled manner during this process, resulting in undesirable deformation of the intermediate product and inclusion of gases, so that the preform or fiber that is obtained has non-reproducible properties. As sheath tube diameters increase, this problem is magnified.

SUMMARY

One embodiment is therefore based on the object of providing a method with which a void-containing intermediate product can be subjected to a thermal and/or reactive treatment that is reproducible and uniform in its effect.

One embodiment is additionally based on the object of providing an apparatus with which a thermal and/or reactive treatment of a void-containing intermediate product can be performed in a sheath tube reliably and with a reproducible result.

This object is achieved according to one embodiment in terms of the method, starting from a method of the type mentioned above, in that a first gas-permeable gas diffuser is inserted into the sheath tube's inner bore, which first gas-permeable gas diffuser is displaceable along the sheath tube's longitudinal axis and is pressed against the intermediate product during the thermal treatment.

The glass component produced by the method according to one embodiment consists of non-doped or of at least partly of doped, in particular of rare earth metal doped, $SiO_2$ (also referred to below as "doped quartz glass"). The doped quartz glass contains at least one dopant. The glass component is made using an intermediate product composed of naturally occurring, or in one embodiment, however, synthetically produced, $SiO_2$ raw material.

BRIEF DESCRIPTION OF DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
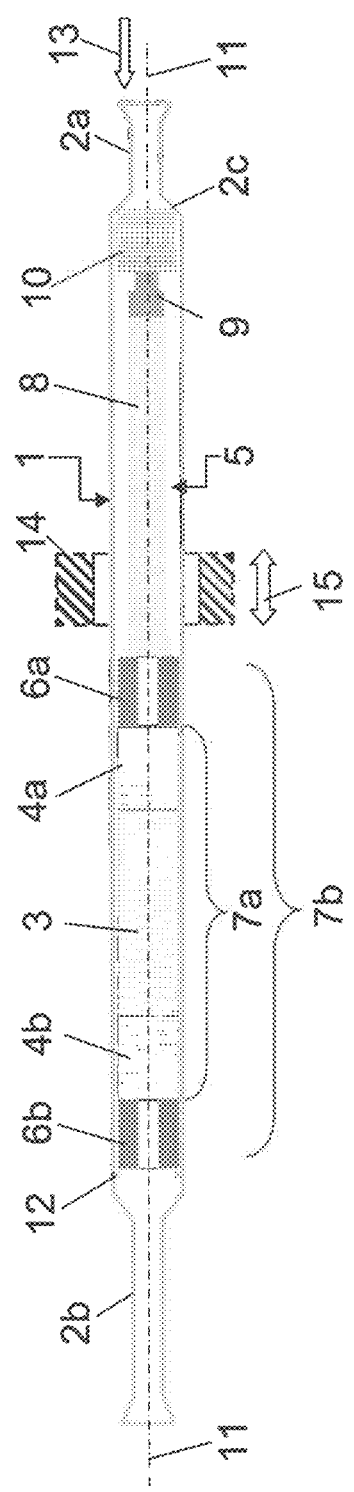
FIG. 1 an exemplary embodiment of a sheath tube construction in a side view.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

In the production of doped quartz glass, either an intermediate product containing a previously doped $SiO_2$ raw material is processed further. In this case the thermal treatment to be carried out at least causes a sintering or vitrification of the intermediate product; however, it can also serve to introduce a dopant or a further dopant.

Or, in the method according to one embodiment, an intermediate product containing a non-doped $SiO_2$ raw material is further processed. In this case the thermal treatment to be carried out serves at least to sinter or vitrify the intermediate product. However, it can also serve to introduce at least one dopant into the intermediate product via the gas phase and then to sinter or vitrify the intermediate product that has been doped in this way.

The method is particularly suitable for producing a glass component consisting at least partly of doped, in particular of rare earth metal doped, $SiO_2$.

At least one component referred to here as a "gas diffuser" is located in the sheath tube's inner bore in direct or indirect contact (contact via an intermediate element) with the intermediate product. It is porous, so that gas can be transported through the gas diffuser along the sheath tube's longitudinal axis. It consists e.g. of glass with open porosity or of pressed and/or sintered particles, such as e.g. a glass frit. Advantageously in one embodiment, the gas diffuser has a porosity identical or similar to that of the intermediate product, but lower shrinkage when the temperature rises.

It can be arranged upstream of the intermediate product in the direction of flow of an incoming gas stream, so that it contributes to a more uniform local and temporal distribution of gas on and in the intermediate product and thus to a more homogeneous action of the gas on the intermediate product and a more reproducible quality of the intermediate product. In addition, the gas diffuser stabilizes the local position and shape of the intermediate product by preventing or reducing the entrainment or displacement of particles of the $SiO_2$ raw material by gas streams during the thermal treatment or during evacuation or the undesirable plastic deformation of the softened intermediate product.

A further contribution thereto is made by the fact that the gas diffuser can be moved along the sheath tube's longitudinal axis and is pressed against an end of the intermediate product during the thermal treatment—even if the sheath tube's longitudinal axis is oriented horizontally. The gas diffuser thus on the one hand, owing to its strength, stiffness and dimensional stability, permits the transfer of the compression force to the intermediate product and on the other hand, owing to its gas permeability, it allows both a degassing and a gassing of the intermediate product for the purpose of doping or cleaning.

The intermediate product here abuts against an abutment. The abutment is generally a spatially fixed bearing; however, it can also be a spatially variable bearing. During the thermal treatment the porous intermediate product generally undergoes a contraction of its length in the direction of the sheath tube's longitudinal axis, e.g. as a result of a decrease in volume (shrinkage) or by deformation. The shortening dimension is also referred to below as the "length" of the intermediate product. It is possible here for gaps or relatively large voids to occur in the construction, which can lead to an uncontrolled collapse of the sheath tube, as a result of which voids with enclosed gases can form and the intermediate product is unintentionally deformed. The gas diffuser tracks the shortening of the intermediate product in the direction of the sheath tube's longitudinal axis. This tracking can, in a first advantageous method variant, take place by external closed-loop or open-loop control, and in another advantageous method variant it takes place automatically by the contraction of length during the thermal treatment itself, in that the tracking of the gas diffuser is caused by the force of weight and/or by a mechanical pre-stress.

In order for the gas diffuser to maintain its shape during the thermal treatment, it in one embodiment consists of a porous glass that has a higher viscosity than the SiO raw material even at high treatment temperatures, such as for instance between 900° C. and 1400° C. Quartz glass generally meets this condition and, furthermore, it contains no harmful contaminants. The quartz glass is in one embodiment not doped or contains dopants in a lower concentration than the doped or undoped $SiO_2$ of the intermediate product.

To prevent the formation of preferred gas flow paths around the intermediate product as far as possible, minimize the loss of intermediate product material due to gas flow and evacuation and counteract undesirable plastic deformations, the gas diffuser initially fills the inner cross-sectional shape of the sheath tube as completely as possible.

On the other hand, in terms of low material loss it is advantageous in one embodiment if, on completion of the thermal treatment, the outer contours of the treated intermediate product and of the gas diffuser differ as little as possible. Since the intermediate product shrinks as a result of the thermal treatment and adopts a final product outer contour, and the gas diffuser likewise shrinks as a result of the thermal treatment and adopts a final gas diffuser outer contour, a gas diffuser is in one embodiment employed which, before the thermal treatment is performed, has an external cross-sectional shape which, taking account of the shrinkages of intermediate product and gas diffuser, is designed such that the final product outer contour and the final gas diffuser outer contour substantially match, e.g. +/−10% based on the largest radial outer contour dimension. In the simplest case, the respective initial outer contours and the overall shrinkages of intermediate product and gas diffuser are the same.

In a procedure in which the gas diffuser experiences lower shrinkage during vitrification than the intermediate product, a gas diffuser is in one embodiment employed which, before the thermal treatment is performed, has an outer contour that substantially matches the initial inner contour of the sheath tube, e.g. leaving a gap dimension of less than 2 mm. This procedure has proved useful for example if the thermal treatment is associated with a doping of the intermediate product by treatment with a gaseous dopant, such as for instance with fluorine or chlorine. To promote a gap dimension that is as narrow as possible and to avoid uncontrollable flow paths and thus also an inhomogeneous dopant distribution here, it is accepted that the final product outer contour and the final gas diffuser outer contour differ or, more precisely: that the final product outer contour has a larger circumference than the final gas diffuser outer contour.

With a view to an action of flowing gas on the intermediate product that is as uniform as possible, and to avoid preferred gas flow paths around the outer circumference of the intermediate product, it has in addition proved expedient if the intermediate product is in the form of a soot body, sintered body or compact and has an external cross-sectional shape that fills an inner cross-sectional shape of the sheath tube leaving a gap with a gap dimension of 1 mm or less.

For an inner bore and a cylindrical intermediate product with circular cross-section, the nominal internal diameter of the inner bore is slightly larger than, and in borderline cases also the same size as, the nominal external diameter of the intermediate product.

In the case of an intermediate product in the form of a bed of particles, the sheath tube is filled with the bed such that, as far as possible, no voids remain, the bed being pressed into the sheath tube as tightly as possible.

The explained effects relate to the use of a first gas diffuser, which is arranged upstream of the intermediate product when viewed in the direction of flow of a treatment gas. They are reinforced in a procedure employing a second gas-permeable gas diffuser, which is arranged downstream of the intermediate product in the direction of flow of the treatment gas. The intermediate product is optionally arranged between the first gas diffuser and the second gas-permeable gas diffuser. During the thermal treatment the first gas diffuser presses against one end of the intermediate product and the second gas diffuser against the other, opposite, end. To apply the compression force it is not necessary for the second gas diffuser also to be moved in the direction of the sheath tube's longitudinal axis; it forms an abutment against which the intermediate product abuts. Otherwise, the statements made about the first gas diffuser relating to its geometric shape, chemical composition, function and shrinkage characteristics also apply to the second gas diffuser. In the simplest case, first and second gas diffusers are produced by the same fabrication method and are identical in terms of shape, porosity and material.

The gas diffusers abutting against both ends of the intermediate product stabilize the intermediate product and, for example, prevent loose or molten, low-viscosity material from the intermediate product from being drawn in an uncontrolled manner through the sheath tube during a thermal treatment under vacuum and thus being able to block existing gas channels, so that gases forming during the thermal treatment can no longer be extracted.

Advantageously in one embodiment, the first gas diffuser and the second gas diffuser are of cylindrical configuration and each have a flat end face adjacent to the intermediate product.

In one advantageous embodiment of the method, a first fixing element is inserted into the sheath tube's inner bore, in or on which at least one through-going gas channel is formed and which is displaced along the sheath tube's longitudinal axis and pressed against the gas diffuser.

The fixing element inserted into the sheath tube's inner bore is directly or indirectly (via a further intermediate element) adjacent to the gas diffuser and transmits a compression force thereto. It has at least one through-going gas channel in an axial direction, so that it does not prevent a gas flow through the sheath tube's inner bore. In contrast to the gas diffuser, however, it in one embodiment consists of a completely impervious material, e.g. of glass; and in one embodiment of quartz glass that has been produced from synthetically generated raw materials. To that extent the fixing element partly seals the porous gas diffuser outwardly, stabilizes it and thus also contributes to holding the intermediate product in its predefined axial position. In addition, when the compression force is applied to a small contact surface it is less easily damaged than the porous gas diffuser material, such as for instance a glass frit. On the other hand, the gas diffuser protects the fixing element from viscous material, or material that has been moved by gas flow or evacuation, passing from the intermediate product into the gas channel or gas channels of the fixing element during sintering or vitrification and thus blocking them.

The fixing element also has a stabilizing effect on the sheath tube; in particular, it counteracts a premature collapse of the sheath tube during a thermal treatment at high temperature and under vacuum.

The at least one gas channel extends completely within the fixing element, e.g. as a through bore, or it is configured as a through-going space between the fixing element's outer wall and the sheath tube's inner wall, e.g. as a longitudinal groove or as a chamfer on the outer wall.

The external cross-sectional shape of the fixing element is in one embodiment adapted to the inner cross-sectional shape of the sheath tube such that a gap remains with a gap width that is as small as possible, e.g. with a gap width of less than 2 mm. The fixing element possesses a circumference that is appropriately adapted to the incircle of the sheath tube, for example. The incircle here is understood to be the largest circle lying completely within the sheath tube's inner bore. The external cross-sectional shapes of gas diffuser and fixing element are, for example, identical.

As explained for the external cross-sectional shape for the gas diffuser, it is also advantageous in one embodiment in terms of low material loss for the fixing element if, on completion of the thermal treatment, the outer contours of the treated intermediate product and of the fixing element differ as little as possible. It should be borne in mind here that the at least one gas channel can completely or partly collapse during the thermal treatment. Thus, not only does the intermediate product adopt a smaller final product outer contour as a result of the thermal treatment, but the fixing element also shrinks as a result of the thermal treatment and adopts a smaller final fixing element outer contour. A fixing element is therefore in one embodiment employed which, before the thermal treatment is performed, has an external cross-sectional shape that is configured, taking account of the shrinkages of intermediate product and fixing element, such that the final product outer contour and the final fixing element outer contour match as closely as possible; e.g. +/−10% based on the largest radial dimension. In the simplest case, the initial outer contours and the total shrinkages of intermediate product and fixing element are identical.

It has also proved expedient if the fixing element has a through bore and a flat first end face facing the gas diffuser, in which, starting from the through bore, gas distribution grooves are recessed in order to influence the gas flow characteristics in the sheath tube.

In a further preferred embodiment of the method, a second fixing element is also provided in conjunction with a second gas diffuser. The first fixing element viewed in the direction of flow of a treatment gas here is in one embodiment arranged upstream of the first gas diffuser, and the second fixing element in the direction of flow is arranged downstream of the second gas diffuser and is adjacent thereto.

The first fixing element, the first gas diffuser, the intermediate product to be treated, the second gas diffuser and the second fixing element are optionally adjacent to each other in an abutting manner in this order.

The abutting arrangement by way of plane-parallel contact surfaces brings about better temperature homogeneity, in particular across the contact surfaces.

Advantageously in one embodiment, the first fixing element and the second fixing element are of cylindrical design and have flat end faces, with which they abut against a flat end face of the respectively allocated gas diffuser.

The statements made for the first fixing element regarding geometric shape, chemical composition, function and collapse characteristics also apply to the second fixing element.

In a particularly preferred procedure, a compression force is generated by means of a clamping device, which directly or indirectly—by way of a movable intermediate element, such as e.g. a fixing element—acts on the first gas diffuser and the intermediate product.

In one embodiment, the compression force acts on the intermediate product without interruption (permanently) in the direction of the sheath tube's longitudinal axis during the thermal treatment. The size of the compression force here is variable or constant. By using the clamping device, high compression forces can be applied even if the sheath tube's longitudinal axis is oriented horizontally, which compression forces can reduce the formation of bubbles in the intermediate product or can even remove them.

In a first method variant, the clamping device comprises an elastically deformable spring element inserted in the sheath tube's inner bore, e.g. a bellows or elastically deformable springs, composed in each case of a temperature-resistant plastic or metal such as Hastelloy, ceramic or quartz glass. The spring element exerts the compression force on the axially movable gas diffuser directly or indirectly—via a longitudinally movable intermediate element, such as e.g. a fixing element—as a function of its current spring force, so that said gas diffuser is pushed towards the intermediate product with each contraction of length of the intermediate product, thus stabilizing it. The pushing of the gas diffuser by the spring element is controlled by the shrinkage of the components in the sheath tube due to the thermal treatment and does not require any external intervention.

In another method variant, the clamping device comprises a slide which is displaceable in the sheath tube's inner bore, having a first magnetic element composed of a magnetic material and a second magnetic element which is movable outside the sheath tube's inner bore in the direction of the longitudinal axis and which acts on the magnetic element. The second magnetic element is e.g. a permanent magnet or a current-carrying coil. The slide—driven by the movement of the second magnetic element—exerts a compression force on the axially movable gas diffuser directly or indirectly—via a longitudinally movable intermediate element, such as e.g. a fixing element. The size of the compression force is adjustable using a closed-loop or open-loop feed control of the external coil; for example, it can be varied constantly or as required. In this method variant, particularly high compressive forces which are variable in size can be exerted on the intermediate product by the open-loop or closed-loop controllable feed of the second magnetic element and slide. The first magnetic element is in one embodiment sealed in a capsule composed of dielectric material to avoid contaminants. The slide should be designed such that it does not prevent the axial gas flow in the sheath tube.

In an advantageous procedure in one embodiment, it is provided that a vacuum is applied in the sheath tube's inner bore at one end of the sheath tube and/or a treatment gas is fed into the sheath tube at an opposite end of the sheath tube.

In this case the intermediate product can, for example, be exposed to the treatment gas that is fed in from one face end of the sheath tube, and at the same time the used or contaminant-laden treatment gas can be drawn off from the intermediate product via the other face end of the sheath tube. During sintering or vitrification of the intermediate product a vacuum is generated and maintained in the sheath tube, but no treatment gas is supplied. As a result of the vacuum in conjunction with the compression force, even if the sheath tube's longitudinal axis is oriented horizontally, bubbles can be removed from the porous intermediate product.

Advantageously, the intermediate product is heated in an electrically heated annular furnace for the thermal treatment.

Compared to heating using a gas-powered heating torch, with an electrically heated annular furnace a long heating zone can be readily achieved, within which internal components of the sheath tube are exposed to a high temperature. As a result, it is possible to achieve a more uniform heat emission and a better heat distribution. This allows a thermal treatment of larger sheath tubes and thus an increase in the output quantity.

The above-mentioned technical object is achieved according to one embodiment in terms of the apparatus, starting from an apparatus of the type mentioned above, in that into the sheath tube's inner bore a first gas-permeable gas diffuser is inserted, which is displaceable along the sheath tube's longitudinal axis towards the intermediate product.

The apparatus is particularly suitable for carrying out the method according to one embodiment. The statements made about the method apply equally to the apparatus. Advantageous embodiments of the apparatus can be taken from the dependent claims. Where embodiments of the apparatus given in the dependent claims are based on the procedures mentioned in dependent claims relating to the method according to one embodiment, reference should be made to the above statements relating to the corresponding method claims for supplementary explanation.

Definitions

Individual method steps and terminology in the present description will be additionally defined below. The definitions are part of the description of the embodiments. In the event of a material discrepancy between one of the following definitions and the rest of the description, the statement made in the description is definitive.

Doped or Non-Doped $SiO_2$ Quartz Glass

Quartz glass here is understood to mean high-silica glass with an $SiO_2$ content of at least 90 mole %. Non-doped quartz glass consists of $SiO_2$ and, apart from components introduced as a result of manufacture and contaminants, it contains no intentionally added substances.

Non-doped $SiO_2$ can contain at least one dopant that has been added as a result of the thermal treatment. The $SiO_2$ to which at least one dopant has already been initially added consists of $SiO_2$ that contains the dopant and/or it contains $SiO_2$ particles that are mixed with powder of the dopant or dopants; at least one further dopant can be added thereto during the thermal treatment.

Doping

The doping consists of one or more dopants. The "dopant" comprises at least one substance, such as e.g. rare earth metal and/or other dopants, added to the glass intentionally in order to achieve desired properties. The rare earth metals include the elements scandium, yttrium and lanthanum and the lanthanoids. The other dopants include e.g. fluorine, chlorine, P, Al, Ge, Ga, Cs, K, B, Li, F, Cl, Fe, Ni, Co, Cr, Mn, Ti and V.

Thermal Treatment

This comprises method steps at elevated temperature for the purpose of sintering (densification), vitrifying (melting), cleaning or doping the intermediate product.

"Sintering" or "densification" here refers to a treatment at an elevated temperature of more than 1100° C., which leads to a compacted glass component composed of opaque, non-transparent glass, in particular quartz glass.

By "vitrification" or "melting", a glass component composed of dense, transparent glass, in particular quartz glass, is obtained.

In a "cleaning", the content of contaminants in the intermediate product is reduced. The main impurities are OH groups, carbon-containing compounds, transition metals, alkali metals and alkaline earth metals originating from the feed material or introduced as a result of the processing operation. The cleaning comprises a treatment at high temperature (>800° C.) under a chlorine-containing, fluorine-containing and/or oxygen-containing atmosphere.

The "doping" of the intermediate product takes place to adjust the refractive index or to influence other material properties such as stress birefringence, photosensitivity and photodegradation. Doping during the thermal treatment comprises a treatment at a temperature ranging from 400 to 1100° C., in particular under a chlorine-containing, fluorine-containing, boron-containing, phosphorus-containing and/or germanium-containing atmosphere.

Granular Materials

A distinction can be made between layering granulation and pressure granulation and, in terms of processing, between wet and dry granulating methods. Known methods are rolling granulation in a pan granulator, spray granulation, frost granulation, centrifugal atomization, fluidized-bed granulation, granulating methods using a granulating mill, compaction, roller presses, briquetting, flake production or extrusion.

During granulation, discrete, relatively large agglomerates, which are referred to here as "$SiO_2$ granular particles" or "granular particles" for short, are formed by aggregations of the $SiO_2$ primary particles. In their totality, the granular particles form an "$SiO_2$ granular material".

Vacuum/Negative Pressure

The intermediate product can be heated under "vacuum". The negative pressure is given as an absolute gas pressure. The term "vacuum" is understood to mean an absolute gas pressure of less than 50 mbar.

Viscosity

The "viscosity" of the quartz glass is measured using a beam-bending viscometer. Beam-bending viscometry covers a viscosity range of $10^8$ to $10^{15}$ dPa·s. The test set-up comprises a heatable three-point bending apparatus with a measuring beam made of the quartz glass to be measured (beam/strip: 50 mm long, 3 mm high, 5 mm wide). The measured variable is the deflection rate at the respective temperature. For undoped quartz glass, typical viscosity values at a temperature of 1280° C. are around $10^{12.1}$ dPa·s and at 1133° C. around $10^{11.3}$ dPa·s.

Softening Temperature

It is known that glasses cannot be assigned a sharply defined softening temperature, but rather they have a softening temperature range. For the purpose of specifying a temperature value in the present case, reference is made to the provision according to DIN ISO 7884 (1998), in which the softening temperature is defined as the temperature at which the glass has a viscosity of $10^{7.6}$ dPa·s. For the softening temperature of undoped quartz glass, temperature values in the range of 1600° C. to 1730° C. are mentioned in the literature.

Intermediate Product

The intermediate product can be present as a bed of particles or of a granular material of an $SiO_2$-containing raw material. Alternatively, it is a porous body composed of $SiO_2$ soot (also known as an $SiO_2$ soot body) or a mechanically or thermally pre-compacted pressed body (compact), sintered body or a green body. The intermediate product in physical form consists of one part or is composed of multiple parts which are arranged e.g. in a stacked fashion. The intermediate product contains voids, is gas-permeable and can be modified and further compacted by thermal treatment, in particular by sintering or vitrification. The glass component, which in one embodiment consists at least in some areas of the doped $SiO_2$, is obtained by sintering or vitrifying the intermediate product.

Incircle/Circumference

The "incircle" denotes the largest circle lying completely within a given inner contour. The "circumference" denotes the smallest circle lying completely outside a given outer contour.

Production of a Porous Intermediate Product Composed of Doped Quartz Glass

In a manner that is known per se, a slip is prepared from discrete, synthetically produced $SiO_2$ particles with a mean particle size of around 10 μm in ultra-pure water. A quantity of 285.7 g of the slip with a residual moisture content of 37.4% is diluted with 1000 ml ultra-pure water. A pH value of 10 is established by adding a concentrated ammonia solution in a quantity of 75 ml.

To prepare a quartz glass doped with $Yb_2O_3$ and $Al_2O_3$, an aqueous dopant solution of $AlCl_3$ and $YbCl_3$ (molar ratio 4:1) in 400 ml ultra-pure water is prepared in parallel and filtered through a 25 μm membrane filter. Instead of the chlorides, other starting substances, such as e.g. organic compounds, nitrides or fluorides, can also be employed.

The suspension, which is agitated by stirring, is supplied with the dopant solution in the form of a spray mist for a period of 65 minutes. To generate the spray mist, the dopant solution is atomized using a spray nozzle, with an operating pressure of 2 bar and a flow rate of 0.8 l/h being established. The spray mist produced in this way contains drops with a mean diameter of between 10 μm and 40 μm. Owing to the high pH value of the suspension, a mixed precipitation of hydroxides and oxides of the two dopants in the form of $Al(OH)_3$ and $Yb(OH)_3$ occurs directly. The solid particles thus formed adsorb on to the existing surfaces of the $SiO_2$ particles and are thereby immobilized, so that a coagulation of the solid particles or a sedimentation is prevented. In this way, a dopant concentration of 2 mole % Al and 0.5 mole % Yb (based on the Si content of the suspension) is established in the slip. Next, the slip to which the dopants have been added is homogenized by stirring for a further 2 hours. This procedure ensures that an optimally homogeneously doped $SiO_2$ slip is obtained.

The doped $SiO_2$ slip is frozen and further processed by so-called frost granulation to form a granular material. The granular material slurry obtained after thawing here is washed repeatedly with ultra-pure water and the excess water is decanted off each time.

Next, the granular material slurry that has been freed of ammonia and cleaned is dried for 6 hours at a temperature of around 400° C. The dried granular material is welded into a plastic mould and isostatically pressed at 400 bar. A compact is obtained (also referred to below as a "granular material compact").

Turning of the Compact

The length of a compact is typically between 70 and 150 mm. The outer circumferential surface of the granular material compact is machined using a turning tool until a predefined external diameter is reached. This is adapted to the internal diameter of the sheath tube with a gap width of 0.3 to 0.5 mm. In addition, the end faces of the compact are processed so that they are plane parallel.

The mechanically processed compact has a cylindrical shape with a diameter of 29.5 mm and a length of 100 mm. Its mean density is around 40-50% of the nominal density of the completely compacted doped quartz glass. It is thermally treated in the sheath tube as an intermediate product in a modified treatment and vitrification process and melted to form a component composed of doped, transparent quartz glass.

Installation in a Sheath Tube

The sheath tube construction will be explained in greater detail below using an example and FIG. 1. The sheath tube construction shown in the form of a diagram comprises a sheath tube 1 composed of quartz glass with a circular inner cross-section and an internal diameter of 30.0 mm and a wall thickness of 2 mm. A first holding tube 2a and a second holding tube 2b are fused on to the two end faces thereof. Both of the holding tubes 2a, 2b have smaller internal diameters than the sheath tube 1, and so the respective transitions from the sheath tube 1 to the holding tubes 2a; 2b form a narrowing of the internal diameter 2c.

Within the sheath tube's inner bore 5 the following internal components are arranged coaxially to the horizontally oriented sheath tube's longitudinal axis 11:

A gas-permeable compact 3 composed of the doped $SiO_2$ raw material to be thermally treated. The compact 3 has a cylindrical shape with flat end faces and a slightly smaller external diameter of 29.5 mm compared to the sheath tube's internal diameter.

At each end of the compact 3, a gas-permeable dummy compact 4a, 4b composed of undoped $SiO_2$ is arranged, which acts as a gas diffuser. The dummy compacts 4a, 4b are obtained in a similar manner to the compact by isostatic pressing of granular material composed of undoped $SiO_2$ in a plastic mould. Their porosity corresponds to that of the granular material compact; the mean density is between 0.9 and 1.0 g/cm$^3$ (i.e. around 40-45% of the nominal density of quartz glass at 2.21 g/cm$^3$). The dummy compacts 4a, 4b likewise have a cylindrical shape and flat end faces at both ends. They enclose the compact 3 to be treated in the manner of a sandwich (sandwich grouping 7a).

Their initial external diameter is likewise 29.5 mm. This external diameter is designed with a view to a gas distribution that is as effective and uniform as possible, and to protection from material loss from the compact. The porous undoped $SiO_2$ of the dummy compacts 4a, 4b is further compacted during the thermal treatment and in particular during the vitrification; however, the shrinkage is somewhat lower than in the compact 3, and so the external diameter after vitrification is somewhat larger than the external diameter of the blank to be produced.

In an alternative procedure, the initial external diameter of the two dummy compacts 4a, 4b is designed such that, after vitrification, it approximately corresponds to the external diameter of the blank to be produced. In this case, the initial external diameter of the two dummy compacts 4a, 4b is approximately 25 mm.

A fixing tube 6a, 6b at each end of the sandwich grouping 7a made up of compact 3 and dummy compacts 4a, 4b. The fixing tubes 6a, 6b consist of non-doped and non-porous quartz glass (with a nominal density of around 2.21 g/cm$^3$). They have a through-bore running through the middle with an internal diameter of 14 mm and an external diameter that corresponds to the initial external diameter of the compact 3, i.e. 29.5 mm in the exemplary embodiment. In the fixing tubes 6a, 6b, both end faces are again flat. The two fixing tubes 6a, 6b outwardly close off the sandwich grouping 7a and together therewith they form a butt arrangement 7b of the internal components 3; 4a; 4b; 6a and 6b.

The inner bore of the fixing tubes 6a, 6b collapses during vitrification only in the respective end section facing the dummy compact 4a; 4b, so that an external diameter of around 25.5 mm is obtained there. Otherwise the inner bore, and thus also the initial external diameter of the fixing tubes 6a, 6b, is maintained.

An inner pipe 8 with an external diameter that is smaller than the sheath tube's internal diameter, which rests against the free end face of the fixing tube 6a with one end and of which the opposite end is provided with a standard ground joint 9.

A bellows 10 composed of PTFE provided with a compression spring, which is connected to the inner pipe 8 by way of the standard ground joint 9 and acts thereon.

For heating during cleaning, doping, sintering or vitrification of the compact 3, an electrically heated annular furnace 14 is provided, which is reversibly movable along the longitudinal axis 11, as indicated by the directional arrow 15.

The entire internal construction of the sheath tube with the internal components 3; 4a; 4b; 6a, 6b; 8; 9 and 10 is axially symmetrical with respect to the longitudinal axis 11 and gas-permeable to an inflowing treatment gas (indicated by the directional arrow 13).

The sheath tube's internal construction is created e.g. by the following work steps:

Step 1: The sheath tube 1 resting against the holding tube 2a at one end is clamped into the three-jaw chuck of a glass lathe. The other end of the sheath tube 1 remains freely accessible in the working area of the glass lathe.

Step 2: The internal components are inserted into the sheath tube 1 into the inner bore 5 in the following order: the bellows 10 and the inner pipe 8, previously joined together by way of the ground joint 9, the first (right-hand) fixing tube 6a, the first (right-hand) dummy compact 4a, the compact 3 to be thermally treated, the second (left-hand) dummy compact 4b, and the left-hand (second) fixing tube 6b.

Step 3: The internal components are pushed into the sheath tube 1 such that the bellows 10 abuts against the diameter narrowing 2c from the sheath tube 1 to the holding tube 2a and is compressed as far as possible, i.e. tensioned. With the bellows 10 tensioned, the sheath tube 1 is spot-heated with a hand torch behind the last installed fixing tube 6b and pressed in at three points distributed around the circumference in order to generate nubs 12 protruding into the sheath tube's inner bore 4, which act as an abutment for the fixing tube 6b.

Step 4: Next, the left-hand holding tube 2b is attached to the sheath tube using a hand torch with continuous rotation around the longitudinal axis 11.

Thermal Treatment of the Mechanically Processed Compact in the Sheath Tube

The granular material compact 3 is heated under a helium flush and then treated for around 8 hours in a chlorine-containing atmosphere at around 900° C. The chlorine-containing treatment gas is introduced into the sheath tube 1 (in the direction of the arrow 13) in a gas flow volume of 35 sccm $Cl_2$ and 15 sccm He by way of the holding tube 2a. At the same time, gas is extracted from the opposite side and thus a vacuum of around 200 mbar (absolute pressure) is generated in the sheath tube's inner bore. As a result, suction of the treatment gas into the pores of the compact 3 and a better flush are achieved.

Because the compact sits in the sheath tube 1 with a "fit", gas flow conditions are obtained in which preferred flow paths around the outer circumference and dead zones having little contact with the reactive gas are minimized. The cleaning treatment of the compact 3 is therefore homogeneous throughout its volume and is reproducible in its action. In this cleaning treatment, contaminants are removed from the compact 3 and the hydroxyl group content is reduced to less than 10 ppm by weight.

The cleaned compact 3 is then subjected to a sheath tube vitrification process. Here, the annular furnace 14 is heated to a temperature of 1250° C. and moved backwards and forwards along the compact 3 in multiple strokes with a transverse velocity of 10 mm/min. At the same time, a vacuum is applied to the sheath tube 1 from both holding tubes 1a; 2b. The reversing movement terminates at both ends approximately in the center of the length of the respective fixing tube 6a; 6b.

Since the compact 3 has a comparatively low density of around 45% of the regular density of quartz glass, a compaction and consequently a significant reduction in volume takes place during the vitrification. As a result of this contraction, gaps are formed in the inner construction of the sheath tube 1, which can lead to gas inclusions and undefined collapsing of the sheath tube 1. These effects are prevented or reduced by the sheath tube construction explained above. The clamping device here ensures that the internal components 3; 4a; 4b; 6a and 6b, which together form a butt arrangement 7b, abut against each other owing to a longitudinal pressure. This pressure is exerted by the PTFE bellows 10 and transmitted to the said internal components by way of the inner pipe 8 (a quartz glass tube with standard ground joint 9 for connecting to the bellows 10). The bellows is designed for a maximum deflection of around 2 cm and with a spring constant of 700 N/m. The inner pipe 8 is sufficiently long that the bellows 10 remains remote from the annular furnace 14, so that it does not overheat during vitrification. The bellows 10 acts as a spring here and is installed under tension, so that when the aforementioned contraction of the compact 3 occurs, a pushing action can take place and thus a compensating of the gaps which is controlled by the vitrification process itself. At the same time, at the opposite end of the sheath tube's inner bore, a vacuum of 25 mbar (absolute pressure) is applied.

During vitrification, the compact 3 is compacted to form bubble-free, rare earth metal doped quartz glass. At the same time the sheath tube 1 collapses on to the compacted granular material compact 3 and on to the dummy compacts 4a; 4b directly surrounding it, and partly on to the fixing tubes 6a; 6b. The volume of the dummy compacts 4a; 4b and fixing tubes 6a; 6b also decreases as a result of the vitrification.

On completion of the sheath tube vitrification, the blank obtained is sawn off on both sides of the former compact 3 in the region of the former dummy compacts 4a; 4b. A preform is obtained with an external diameter of 24 mm, comprising a cylindrical core with a diameter of around 20 mm composed of the rare earth metal doped quartz glass and a cladding composed of the sheath tube material that has collapsed thereon. The blank is further processed into a preform. This further processing can comprise e.g. a grinding of the sheath tube material, a thermo-mechanical homogenizing of the ground core rod that is obtained in order to resolve defects (such as e.g. crystallites), and a cladding of the homogenized core rod with a cladding tube. A laser fiber preform is obtained which is drawn in the final step to form a fiber.

The initial external diameter ($D_0$) of the sheath tube's internal components: granular material compact 1, dummy compacts 4a; 4b and fixing tubes 6a; 6b, can be designed as a function of the shrinkage to be expected during the sheath tube vitrification such that on completion of the vitrification process, as far as possible the same final external diameters ($D_f$) are obtained and thus as far as possible a flush arrangement of the aforementioned internal components. In the present exemplary embodiment, however, the external diameters of the sheath tube's internal components are designed for the most effective gas distribution possible in the treatment process and thus a substantial initial filling of the internal diameter of the sheath tube's inner bore. In Table 1 below, relevant data relating to the internal components are compiled.

TABLE 1

|  | Compact | Dummy compact | Fixing tube |
|---|---|---|---|
| Material | $Yb_2O_3$, $Al_2O_3$, $SiO_2$ | $SiO_2$ | $SiO_2$ |
| $D_0$ [mm] | 29.5 | 29.5 | 29.5 |
| $D_f$ [mm] | 20 | 21 | 26 |

Figure 2:
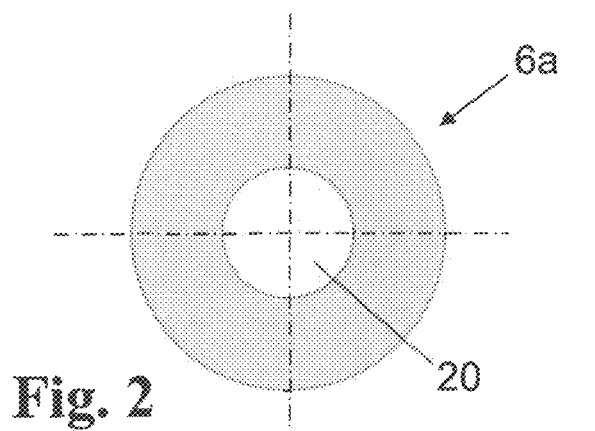
FIG. 2 a fixing tube for the sheath tube construction of FIG. 1 in an enlarged illustration and in a view of the radial cross-section, FIG. 3 another embodiment of a fixing tube in a radial cross-section, FIG. 4 a further embodiment of a fixing tube in a radial cross-section, FIG. 5 a further embodiment of a fixing tube in a radial cross-section, and FIG. 6 a further exemplary embodiment of a sheath tube construction in a side view with an alternative clamping device.

FIG. 2 shows in schematic form an enlarged illustration of the fixing tube 6a with the inner bore 20 running through the middle in a view of the radial cross-section.

The fixing tube 6a has a flat end face facing the compact, on which end face multiple slits are cut, which extend radially from the inner bore to the cylindrical outer surface. The slits 21 bring about an optimized guidance of the treatment gases.

Figure 3:
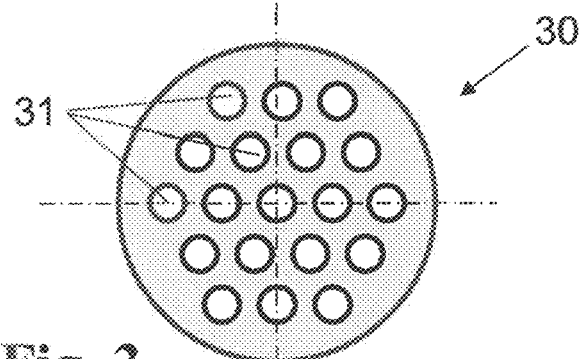

The embodiment of a fixing tube 30 shown schematically in FIG. 3 is configured as a quartz glass cylinder with a plurality of small through bores 31. The fixing tube 30 acts as a gas distributing element arranged upstream of the dummy compact, with which the treatment gas can be distributed uniformly upstream of the dummy compact. The smaller and more numerous the through bores 31, the more effective is the gas distribution. In an extreme case, the through bores are configured as microchannels or capillaries in which a certain back pressure builds up.

Figure 4:
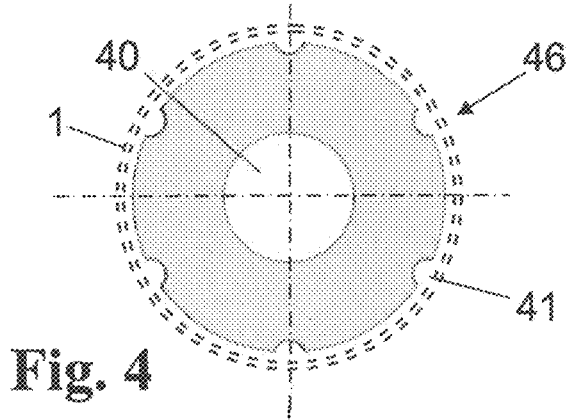

The embodiment of the fixing tube 46 of FIG. 4 has both an inner bore 40 running through the middle and multiple grooves 41 in the cylindrical outer surface distributed around the outer circumference, which form additional through-going gas channels in conjunction with the sheath tube 1.

Figure 5:
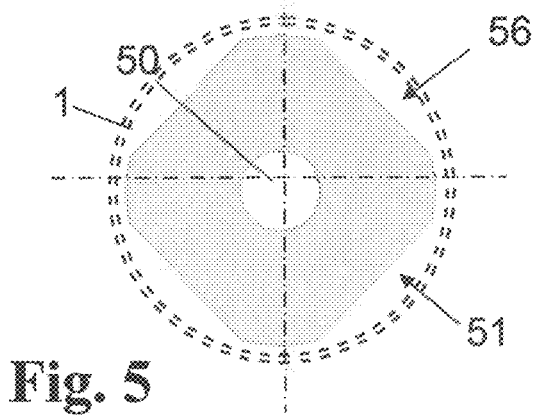

In the embodiment of the fixing tube 56 of FIG. 5, an inner bore 50 running through the middle is likewise provided. In addition, the cylindrical outer surface is flattened in four areas uniformly distributed around the outer circumference. The flattened portions 51 likewise form additional through-going gas channels in conjunction with the sheath tube 1.

Figure 6:
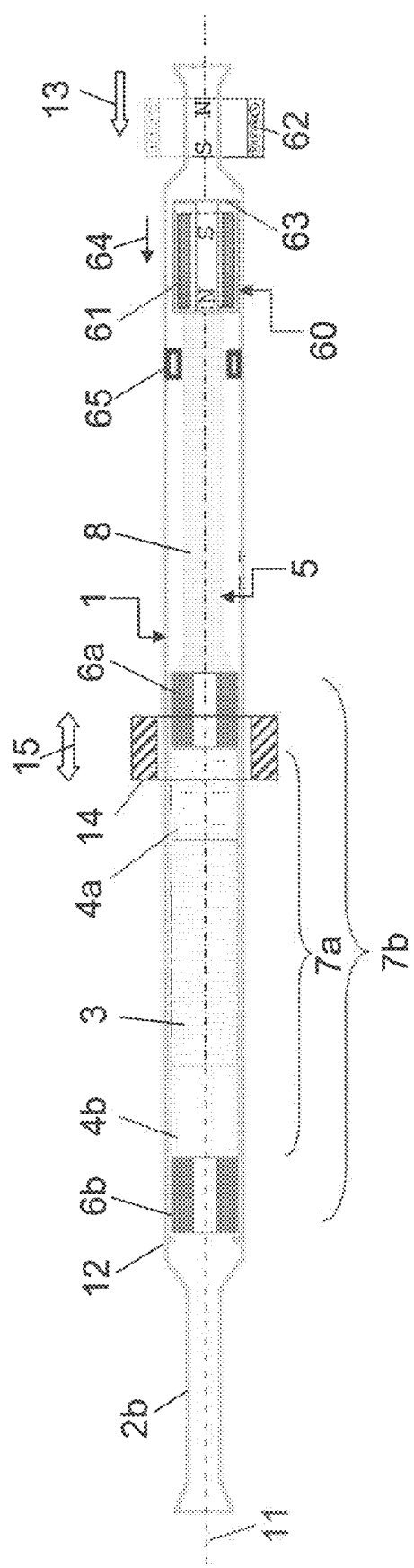

FIG. 6 shows an alternative sheath tube construction in a schematic diagram. Where the same reference numbers are used as in FIG. 1, these denote components that are identical or equivalent to those explained above for the sheath tube construction with reference to FIG. 1. The only difference lies in the clamping device which, instead of a bellows (10 in FIG. 1), comprises a slide 60 with a magnetic element 61 composed of a magnetic material which is displaceable in the sheath tube's inner bore, and a current-carrying coil 62 which is movable in the direction of the longitudinal axis 11, [and which] is displaceable over the sheath tube 1 and along the longitudinal axis 11 thereof.

The magnetic element 61 is an annular permanent magnet, which is welded into a double-walled quartz glass tube 63. The slide 60 together with the annular magnet fastened therein can be displaced towards one end of the pipe 8 using the coil 62, as indicated by the directional arrows 64, and presses said pipe against the face end of the fixing tube 6a. For the axial guidance of the pipe, multiple spacers 65 are distributed around the inner circumference of the sheath tube 1. Between the slide 60 and the inner wall of the sheath tube 1, an annular gap of around 3 mm remains, so that there is no significant negative impact on the gas flow through the sheath tube.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method of producing a glass component, comprising:
preparing a void-containing intermediate product that contains doped or non-doped $SiO_2$;
introducing the intermediate product into a sheath tube composed of glass, which has a longitudinal axis and an inner bore; and
thermal treating the intermediate product in the sheath tube,
wherein a first gas-permeable gas diffuser is inserted into the sheath tube's inner bore, which first gas-permeable gas diffuser is displaceable along the sheath tube's longitudinal axis and is pressed against the intermediate product during the thermal treatment,
wherein a compression force is generated by means of a clamping device, which exerts a pressure on the first gas diffuser, and
wherein the clamping device comprises an elastically deformable spring element inserted in the sheath tube's inner bore, or a slide which is displaceable in the sheath tube's inner bore and having a first magnetic element composed of a magnetic material and a second magnetic element which is movable in the direction of the longitudinal axis outside the sheath tube's inner bore and which acts on the magnetic element.

2. The method according to claim 1, wherein the first gas diffuser consists of a porous glass, which has a higher viscosity compared to the doped or non-doped $SiO_2$.

3. The method according to claim 1, wherein the intermediate product is heated in an electrically heated annular furnace for the thermal treatment.

4. The method according to claim 1, wherein the intermediate product is in the form of a soot body, sintered body or compact and has an external cross-sectional shape that fills an inner cross-sectional shape of the sheath tube leaving a gap with a gap width of no more than 1 mm.

5. The method according to claim 1, wherein at one end of the sheath tube a vacuum is applied in the sheath tube's inner bore and/or at an opposite end of the sheath tube a treatment gas is fed into the sheath tube.

6. The method according to claim 1, wherein the elastically deformable spring element inserted in the sheath tube's inner bore is a bellows.

7. The method according to claim 1, wherein the intermediate product is arranged between the first gas diffuser and a second gas-permeable gas diffuser.

8. The method according to claim 7, wherein the first gas diffuser and the second gas diffuser are configured in a cylindrical shape and each of the first and second gas diffusers have a flat end face adjacent to the intermediate product.

9. The method according to claim 1, wherein into the sheath tube's inner bore a first fixing element is inserted, in or on which at least one through-going gas channel is formed and which is displaced along the sheath tube's longitudinal axis and pressed against the first gas diffuser.

10. The method according to claim 9, wherein the first fixing element consists of a gas-tight material, and quartz glass made from synthetically produced raw materials.

11. The method according to claim 9, wherein the first fixing element, viewed in the direction of flow of a treatment gas, is arranged upstream of the first gas diffuser and that a second fixing element in the direction of flow is arranged downstream of the second gas diffuser and is adjacent thereto.

12. The method according to claim 11, wherein the first fixing element, the first gas diffuser, the intermediate product to be treated, the second gas diffuser and the second fixing element are adjacent to each other in an abutting manner in this order.

13. An apparatus for producing a glass component comprising:
- a sheath tube composed of glass for receiving a void-containing intermediate product;
- wherein the sheath tube has a longitudinal axis and an inner bore; and
- wherein a first gas-permeable gas diffuser is inserted into the sheath tube's inner bore, which is displaceable along the sheath tube's longitudinal axis towards the intermediate product, wherein a clamping device is inserted into the sheath tube inner bore, which exerts a pressure on the first gas diffuser, and
- wherein the clamping device comprises an elastically deformable spring element inserted in the sheath tube's inner bore, or a slide which is displaceable in the sheath tube's inner bore and having a first magnetic element composed of a magnetic material and a second magnetic element which is movable in the direction of the longitudinal axis outside the sheath tube's inner bore and which acts on the magnetic elem.

14. The apparatus according to claim 13, wherein into the sheath tube's inner bore a first fixing element is inserted, which is displaceable along the sheath tube's longitudinal axis and which presses against the first gas diffuser, and in or on which at least one through-going gas channel is formed.

* * * * *